US009503949B2

(12) United States Patent
Yamamoto et al.

(10) Patent No.: US 9,503,949 B2
(45) Date of Patent: Nov. 22, 2016

(54) METHOD, SYSTEMS AND APPARATUSES FOR SELECTING STATIONS FOR MOBILE STATIONS IN A MOVING OBJECT

(71) Applicant: MITSUBISHI HEAVY INDUSTRIES, LTD., Tokyo (JP)

(72) Inventors: Syusaku Yamamoto, Tokyo (JP); Masatoshi Tominaga, Tokyo (JP); Shinichi Hayashi, Tokyo (JP); Yutaka Miyajima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/428,123

(22) PCT Filed: Jul. 1, 2013

(86) PCT No.: PCT/JP2013/068001
§ 371 (c)(1),
(2) Date: Mar. 13, 2015

(87) PCT Pub. No.: WO2014/050243
PCT Pub. Date: Apr. 3, 2014

(65) Prior Publication Data
US 2015/0264611 A1 Sep. 17, 2015

(30) Foreign Application Priority Data

Sep. 25, 2012 (JP) .................. 2012-211136

(51) Int. Cl.
*H04B 7/00* (2006.01)
*H04W 36/00* (2009.01)
(Continued)

(52) U.S. Cl.
CPC .............. *H04W 36/08* (2013.01); *H04L 67/12* (2013.01); *H04W 36/0083* (2013.01);CPC ..... *H04W 36/32* (2013.01); *H04W 72/0453* (2013.01); *H04W 36/026* (2013.01); *H04W 84/005* (2013.01); *H04W 88/08* (2013.01)

(58) Field of Classification Search
CPC ... H04W 48/20; H04W 36/32; H04W 48/18; H04W 48/16; H04W 48/02
USPC .......................................... 455/524, 525, 436
See application file for complete search history.

(56) References Cited

U.S. PATENT DOCUMENTS

2010/0069070 A1* 3/2010 Shi ........................ H04W 36/32
455/436
2011/0124330 A1* 5/2011 Kojima ................. H04W 36/32
455/424

FOREIGN PATENT DOCUMENTS

JP H11-261478 A 9/1999
JP H11-308657 A 11/1999
(Continued)

OTHER PUBLICATIONS

PCT/ISA/210, "International Search Report for PCT/JP2013/068001," Jul. 23, 2013.
(Continued)

*Primary Examiner* — Omoniyi Obayanju
(74) *Attorney, Agent, or Firm* — Manabu Kanesaka; Benjamin Hauptman; Kenneth M. Berner

(57) ABSTRACT

A mobile communication system includes a mobile station and base stations, and the mobile station includes a base station selection unit, a first selected base station determination unit, a second selected base station determination unit, an inhibition command data transmission unit that transmits data for commanding inhibition of a downlink to a base station when the first selected base station determination unit determines that the base station is selected at the previous time and is not selected at this time, and a permission command data transmission unit that transmits data for commanding permission of a downlink to a base station when the second selected base station determination unit determines that the base station is not selected at the previous time and is selected at this time.

6 Claims, 4 Drawing Sheets

(51) Int. Cl.
*H04W 36/08* (2009.01)
*H04L 29/08* (2006.01)
*H04W 36/32* (2009.01)
*H04W 72/04* (2009.01)
*H04W 84/00* (2009.01)
*H04W 88/08* (2009.01)
*H04W 36/02* (2009.01)

(56) References Cited

FOREIGN PATENT DOCUMENTS

| JP | 2001-16157 A | 1/2001 |
| JP | 2002-33694 A | 1/2002 |
| JP | 3451543 B2 | 9/2003 |
| JP | 2005-236463 A | 9/2005 |
| JP | 2008-500766 A | 1/2008 |
| JP | 2008-099233 A | 4/2008 |
| JP | 2009-194855 A | 8/2009 |
| JP | 2009-272905 A | 11/2009 |

OTHER PUBLICATIONS

PCT/ISA/237, "Written Opinion of the International Searching Authority for PCT/JP2013/068001," Jul. 23, 2013.
Japan Patent Office, Office Action for Japanese Patent Application No. 2012-211136, Jun. 14, 2016.

* cited by examiner

METHOD, SYSTEMS AND APPARATUSES FOR SELECTING STATIONS FOR MOBILE STATIONS IN A MOVING OBJECT

RELATED APPLICATIONS

The present application is National Phase of International Application No. PCT/JP2013/068001 filed Jul. 1, 2013, and claims priority from Japanese Application No. 2012-211136, filed Sep. 25, 2012, the disclosure of which is hereby incorporated by reference herein in its entirety.

TECHNICAL FIELD

The present invention relates to a mobile communication system, a mobile communication method, a mobile station, a program, and a recording medium. Particularly, the present invention relates to a mobile communication system in which a mobile station performs communication while moving, a mobile communication method, a mobile station provided in a moving object moving along a predetermined route, a program causing a computer to serve as the mobile station, and a recording medium recording the program. Priority is claimed on Japanese Patent Application No. 2012-211136, filed Sep. 25, 2012, the content of which is incorporated herein by reference.

BACKGROUND ART

A next generation streetcar system is a next generation track transportation system. In the next generation streetcar system, wireless communication is performed between a mobile station provided in a train and base stations provided along a track. In this case, multiple base stations are provided along the track. Therefore, when the train travels along the track, the mobile stations continuously perform communication by performing handover for, for example, a base station having the best radio wave reception state among the plurality of base stations.

When there is a structure such as a station building or a tall building between the track and the base station, since a radio wave reception state on the train rapidly deteriorates due to the influence of shadowing, there is a case in which communication is interrupted. For example, when communication is interrupted for several seconds, it is probable that a critical problem such as frame drop or frame freeze occurs in image transmission and the like in which real-time property is required.

Various technologies associated with such a background have been known (for example, refer to Patent Literature 1).

For example, Patent Literature 1 discloses a wireless train control system in a railway security system, which performs a ground-based wireless transmission apparatus switching operation when a train moves during communication. In more detail, in the train control system, a handover point, which is a point at which an on-board wireless transmission apparatus changes the ground-based wireless transmission apparatus serving as a communication destination, is stored in a ground control apparatus. The train control system determines whether the train approaches the handover point based on position information transmitted by the train. When the train control system determines that the train approaches the handover point, the train control system reserves in advance a communication channel for communicating with the ground-based wireless transmission apparatus serving as the next communication destination of the train in communication with the ground control apparatus. In this way, according to the train control system, it is possible to reliably reserve a wireless channel regardless of the influence of a change in the strength and the like of a radio wave due to a peripheral environment.

CITATION LIST

Patent Literature

[Patent Literature 1]
Japanese Patent (Granted) Publication No. 3451543

SUMMARY OF INVENTION

Technical Problem

In the train control system disclosed in Patent Literature 1, the ground-based wireless transmission apparatuses perform communication through channels different from one another. Consequently, according to the train control system disclosed in Patent Literature 1, handover should be performed in order to avoid shadowing.

In relation to the state of radio waves on a track, the state of radio waves from one ground-based wireless transmission apparatus is not always good, and there is a case in which the state of radio waves from a plurality of ground-based wireless transmission apparatuses is good. However, in the train control system disclosed in Patent Literature 1, although there are a plurality of ground-based wireless transmission apparatuses in which the state of radio waves is good, since only one of the ground-based wireless transmission apparatuses performs communication, other ground-based wireless transmission apparatuses may not be effectively utilized.

Solution to Problem

According to the first aspect of the present invention, a mobile communication system in which a mobile station performs communication while moving includes a mobile station provided in a moving object moving along a predetermined route, and a plurality of base stations provided along the route, wherein each of the plurality of base stations performs wireless communication with the mobile station through the same channel of the same frequency band, wherein the mobile station includes a base station selection unit that repeatedly selects two base stations, with which the mobile station should simultaneously communicate, among the plurality of base stations sequentially, a first selected base station determination unit that compares base stations selected by the base station selection unit at this time with base stations selected by the base station selection unit at a previous time and determines whether there is a first base station selected at the previous time and is not selected at this time, a second selected base station determination unit that compares the base stations selected by the base station selection unit at this time with the base stations selected by the base station selection unit at the previous time and determines whether there is a second base station not selected at the previous time and selected at this time, an inhibition command data transmission unit that transmits data for commanding inhibition of a downlink to the base station when the first selected base station determination unit determines that the base station is selected at the previous time and is not selected at this time and a permission command data transmission unit that transmits data for commanding permission of a downlink to the base station when the second selected base station determination unit determines that the base station is not selected at the previous time and is selected at this time.

When there is the mobile station in an area in which a communication range of one base station of two geographically adjacent base stations among the plurality of base stations and a communication range of the other base station of the two geographically adjacent base stations among the plurality of base stations overlap each other, the geographically adjacent two base stations may be disposed such that a difference between a distance from the one base station to the mobile station and a distance from the other base station to the mobile station is smaller than a distance to which a radio wave can propagate for a time corresponding to a length of a guard interval of data simultaneously transmitted from the geographically adjacent two base stations.

When there is the mobile station in an area in which a communication range of one base station of two geographically adjacent base stations among the plurality of base stations and a communication range of the other base station of the two geographically adjacent base stations among the plurality of base stations overlap each other, the geographically adjacent two base stations may be disposed such that a difference between a distance from the one base station to the mobile station and a distance from the other base station to the mobile station is smaller than a distance to which a radio wave can propagate for a time required for switching a state of using a spread code designated in the one base station to a state of using a spread code designated in the other base station.

According to the second aspect of the present invention, a mobile communication method in which a mobile station performs communication while moving includes a base station selection step in which a mobile station provided in a moving object moving along a predetermined route repeatedly selects two base stations, with which the mobile station should simultaneously communicate, among a plurality of base stations, which are provided along the route and each perform wireless communication with the mobile station through the same channel of the same frequency band, with the passage of time, a first selected base station determination step in which the mobile station compares base stations selected at this time in the base station selection step with base stations selected at a previous time in the base station selection step and determines whether there is a first base station selected at the previous time and not selected at this time, a second selected base station determination step in which the mobile station compares the base stations selected at this time in the base station selection step with the base stations selected at the previous time in the base station selection step and determines whether there is a second base station not selected at the previous time and selected at this time, an inhibition command data transmission step in which, when it is determined in the first selected base station determination step that the base station is selected at the previous time and is not selected at this time, the mobile station transmits data for commanding inhibition of a downlink to the base station and a permission command data transmission step in which, when it is determined in the second selected base station determination step that the base station is not selected at the previous time and is selected at this time, the mobile station transmits data for commanding permission of a downlink to the base station.

According to the third aspect of the present invention, a mobile station provided in a moving object moving along a predetermined route includes a base station selection unit that repeatedly selects two base stations, with which the mobile station should simultaneously communicate, from among a plurality of base stations, which are provided along the route and each perform wireless communication with the mobile station through the same channel of the same frequency band, sequentially, a first selected base station determination unit that compares base stations selected by the base station selection unit at this time with base stations selected by the base station selection unit at a previous time and determines whether there is a first base station selected at the previous time and not selected at this time, a second selected base station determination unit that compares the base stations selected by the base station selection unit at this time with the base stations selected by the base station selection unit at the previous time and determines whether there is a second base station not selected at the previous time and selected at this time; an inhibition command data transmission unit that transmits data for commanding inhibition of a downlink to the base station when the first selected base station determination unit determines that the base station is selected at the previous time and is not selected at this time and a permission command data transmission unit that transmits data for commanding permission of a downlink to the base station when the second selected base station determination unit determines that the base station is not selected at the previous time and is selected at this time.

According to the fourth aspect of the present invention, a program, which causes a computer to serve as a mobile station provided in a moving object moving along a predetermined route, causes the computer to serve as a base station selection unit that repeatedly selects two base stations, with which the mobile station should simultaneously communicates, among a plurality of base stations, which are provided along the route and each perform wireless communication with the mobile station through the same channel of the same frequency band, sequentially, a first selected base station determination unit that compares base stations selected by the base station selection unit at this time with base stations selected by the base station selection unit at a previous time and determines whether there is a first base station selected at the previous time and not selected at this time, a second selected base station determination unit that compares the base stations selected by the base station selection unit at this time with the base stations selected by the base station selection unit at the previous time and determines whether there is a second base station not selected at the previous time and selected at this time, an inhibition command data transmission unit that transmits data for commanding inhibition of a downlink to the base station when the first selected base station determination unit determines that the base station is selected at the previous time and is not selected at this time, and a permission command data transmission unit that transmits data for commanding permission of a downlink to the base station when the second selected base station determination unit determines that the second base station is not selected at the previous time and is selected at this time.

According to the fifth aspect of the present invention, a recording medium, which records a program that causes a computer to serve as a mobile station provided in a moving object moving along a predetermined route, records the program that causes the computer to serve as a base station selection unit that repeatedly selects two base stations, with which the mobile station should simultaneously communicate, among a plurality of base stations, which are provided along the route and each perform wireless communication with the mobile station through the same channel of the same frequency band, sequentially, a first selected base station determination unit that compares base stations selected by the base station selection unit at this time with base stations selected by the base station selection unit at a previous time and determines whether there is a first base station selected at the previous time and not selected at this time, a second selected base station determination unit that compares the base stations selected by the base station selection unit at this time with the base stations selected by the base station selection unit at the previous time and determines whether there is a second base station not selected at the previous time and selected at this time, an inhibition command data transmission unit that transmits data for commanding inhibition of a downlink to the first base station when the first selected base station determination unit determines that the first base station is selected at the previous time and is not selected at this time, and a permission command data transmission unit that transmits data for commanding permission of a downlink to the second base station when the second selected base station determination unit determines that the second base station is not selected at the previous time and is selected at this time.

In the overview of the invention, all necessary features of the present invention are not enumerated. Subcombinations of these feature groups may also be an invention.

Advantageous Effects of Invention

Apparent from the above description, according to the aforementioned aspects, it is possible to effectively utilize only two necessary base stations of a plurality of base stations with which a mobile station can communicate.

DESCRIPTION OF EMBODIMENTS

Hereinafter, the present invention will be described through an embodiment of the invention; however, the following embodiment does not limit the invention according to the scope of claims, and all combinations of features described in the embodiment are not necessary for solutions of the invention.

Figure 1:
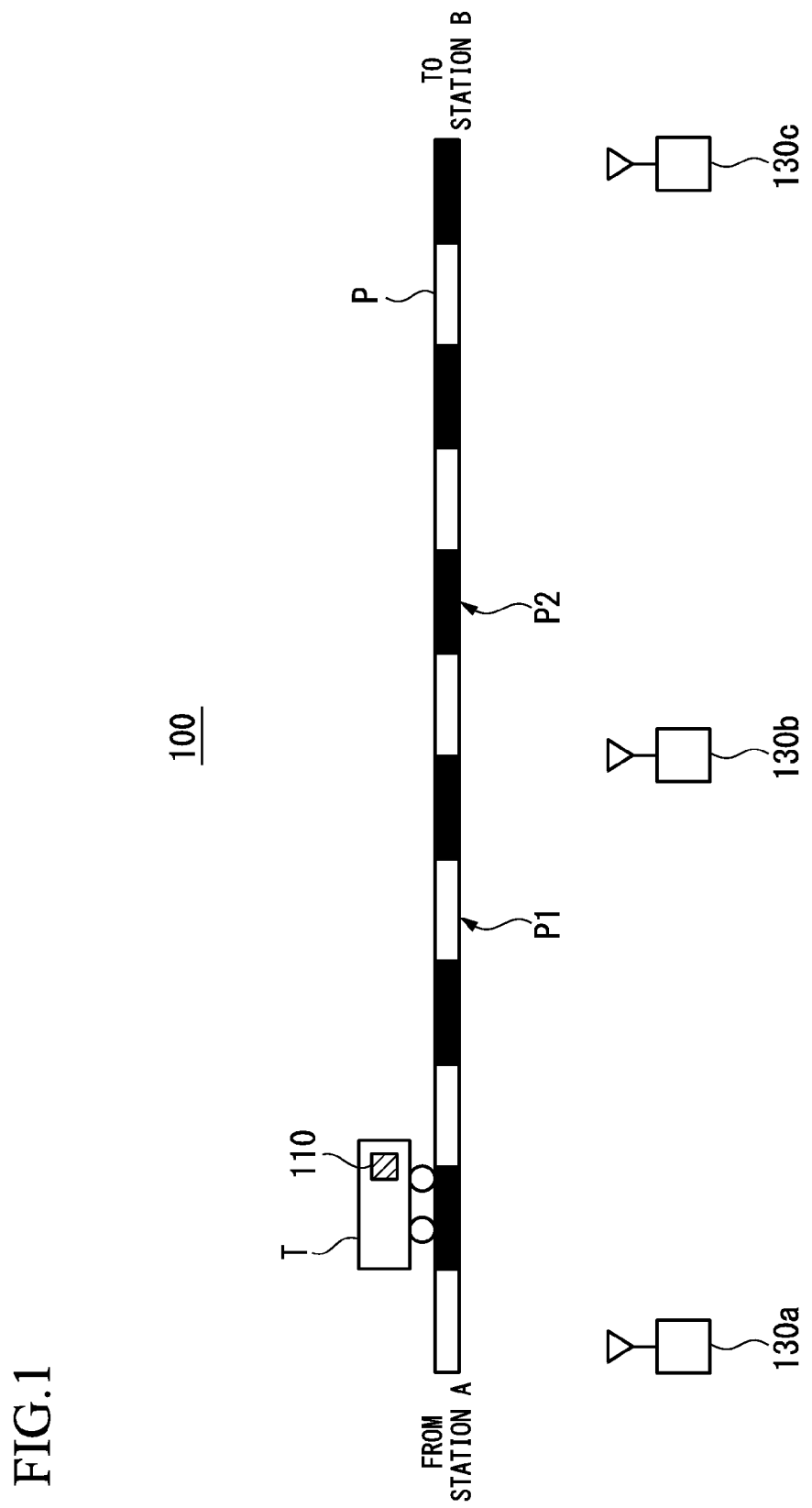
FIG. 1 is a diagram showing one example of a use environment of a mobile communication system 100 according to one embodiment.

FIG. 1 illustrates one example of a use environment of a mobile communication system 100 according to one embodiment. The mobile communication system 100 is a system in which a mobile station 110 performs communication while moving.

The mobile communication system 100 includes the mobile station 110 and a plurality of base stations 130a, b, c, . . . (hereinafter, referred to as base stations 130).

The mobile station 110 is provided in a train T. The train T is a vehicle that travels on a track P. The train T may also be one example of a "moving object" in the invention. The track P may also be one example of a "predetermined route" in the invention. The traveling on the track P may also be one example of "moving along the predetermined route" in the invention.

The base stations 130 are provided along the track P. The base stations 130 perform wireless communication with the mobile station 110 through the same channel of the same frequency band, respectively. Consequently, for example, in the case in which the train T exists in a section in which communication ranges of two base stations 130 overlap each other, when data is transmitted to the mobile station 110 from a server and the like on a network, the mobile station 110 receives the same data transmitted through the two base stations 130. In such a case, the mobile station 110 receives both the data transmitted from one base station 130 and the data transmitted from the other base station 130 at timings different from each other.

In the mobile communication system 100, when OFDM (orthogonal frequency division multiplexing) is employed in communication between the mobile station 110 and the base stations 130, a guard interval is used in order to prevent intersymbol interference. In this case, when there is the mobile station 110 in an area in which a communication range of one base station 130 and a communication range of the other base station 130 overlap each other, the two geographically adjacent base stations 130 of the plurality of base stations 130 are disposed such that a difference between a distance from the one base station 130 to the mobile station 110 and a distance from the other base station 130 to the mobile station 110 is smaller than a distance to which a radio wave can propagate for a time corresponding to a guard interval of data simultaneously transmitted from the two base stations 130. For example, when a distance from the base station 130a to the mobile station 110 is set as La, a distance from the base station 130b to the mobile station 110 is set as Lb, the length of a guard interval is set as T, and a light speed is set as c, the base station 130a and the base station 130b are each provided at positions satisfying a condition of |La−Lb|T×c.

In the mobile communication system 100, when CDMA (code division multiple access) is employed in communication between the mobile station 110 and the base stations 130, the base stations 130 use spread codes which are different from each other. In this case, when there is the mobile station 110 in an area in which a communication range of one base station 130 and a communication range of the other base station 130 overlap each other, the two geographically adjacent base stations 130 of the plurality of base stations 130 are disposed such that a difference between a distance from the one base station 130 to the mobile station 110 and a distance from the other base station 130 to the mobile station 110 is smaller than a distance to which a radio wave can propagate for a time required for switching a state of using a spread code designated in the one base station 130 to a state of using a spread code designated in the other base station 130.

In the present embodiment, for the purpose of preventing the complication of description, a configuration in which the mobile communication system 100 includes one mobile station 110 will be described. However, the mobile communication system 100 may also include a plurality of mobile stations 110.

Figure 2:
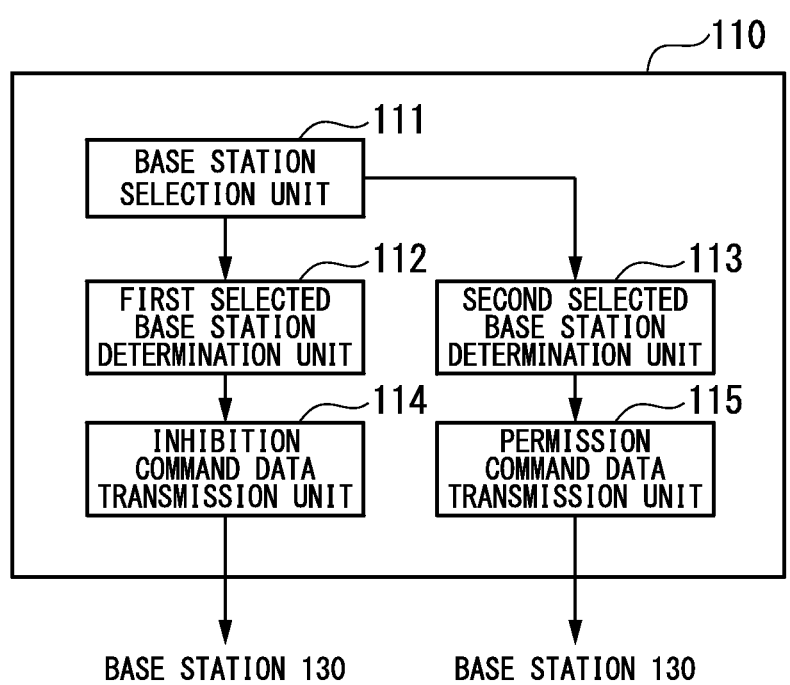
FIG. 2 is a block diagram showing one example of a configuration of a mobile station 110.

FIG. 2 is a block diagram showing one example of a configuration of the mobile station 110. The mobile station 110 includes a base station selection unit 111, a first selected base station determination unit 112, a second selected base station determination unit 113, an inhibition command data transmission unit 114, and a permission command data transmission unit 115. In the following description, the function and the operation of each element will be described in detail.

The base station selection unit 111 repeatedly selects two base stations 130, with which the mobile station 110 should simultaneously communicate, from among the plurality of base stations 130 with the passage of time.

The first selected base station determination unit 112 compares base stations 130 selected by the base station selection unit 111 at this time with base stations 130 selected by the base station selection unit 111 at the previous time, and determines whether there is a base station 130 selected at the previous time and not selected at this time.

The second selected base station determination unit 113 compares the base stations 130 selected by the base station selection unit 111 at this time with the base stations 130 selected by the base station selection unit 111 at the previous time, and determines whether there is a base station 130 not selected at the previous time and selected at this time.

When the first selected base station determination unit 112 determines that the base station 130 is selected at the previous time and is not selected at this time, the inhibition command data transmission unit 114 transmits data for commanding the inhibition of a downlink to the base station 130.

When the second selected base station determination unit 113 determines that the base station 130 is not selected at the previous time and is selected at this time, the permission command data transmission unit 115 transmits data for commanding the permission of a downlink to the base station 130.

Figure 3:
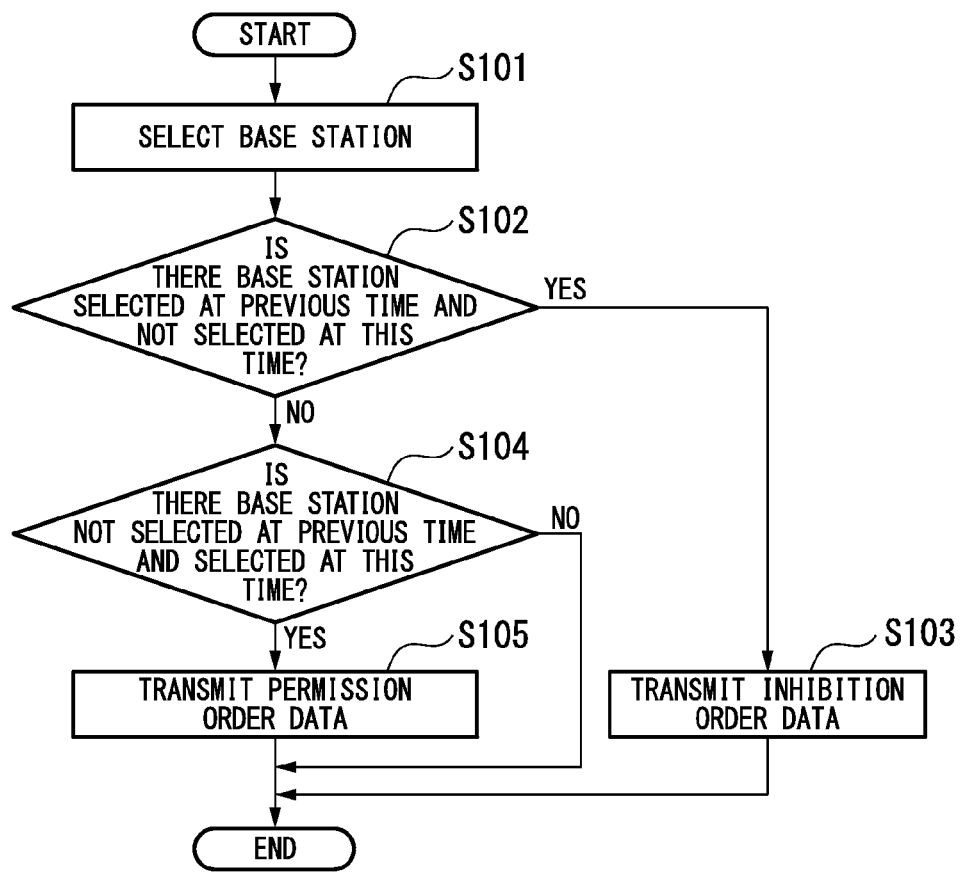
FIG. 3 is a diagram showing one example of an operation flow of a mobile station 110.

FIG. 3 is a diagram showing one example of an operation flow of the mobile station 110. In the description of the operation flow, a process for controlling on/off of a downlink from the base station 130 will be described in detail. In the description of the operation flow, FIG. 1 and FIG. 2 will be commonly referred to.

Hereinafter, the case in which the train T moves on the track P from a station A to a station B will be described as an example.

The base station selection unit 111 of the mobile station 110 repeatedly selects two base stations 130, with which the mobile station 110 should simultaneously communicate, from among the plurality of base stations 130 with the passage of time (S101). For example, the base station selection unit 111 selects two base stations 130 in a command of strong radio field intensity strength from among the plurality of base stations 130 with which the mobile station 110 can communicate at a present position. Whenever the base station selection unit 111 selects the base stations 130, the base station selection unit 111 transmits data indicating the base stations 130 to the first selected base station determination unit 112 and the second selected base station determination unit 113.

When the data transmitted from the base station selection unit 111 is received, the first selected base station determination unit 112 of the mobile station 110 compares the base stations 130 indicated by the data and selected at this time with base stations 130 indicated by data received at the previous time and selected at the previous time, and determines whether there is a base station 130 selected at the previous time and not selected at this time (S102). When it is determined that the base station 130 is selected at the previous time and is not selected at this time (S102: Yes), the first selected base station determination unit 112 transmits data indicating the base station 130 to the inhibition command data transmission unit 114.

When the data transmitted from the first selected base station determination unit 112 is received, the inhibition command data transmission unit 114 of the mobile station 110 transmits data for commanding the inhibition of a downlink to the base station 130 indicated by the data (S103). In this way, until data for commanding the permission of a downlink is received, for example, although data transmitted from a server and the like on a network and addressed to the mobile station 110 is received, the base station 130 having received the data discards the data and does not transmit the data to the mobile station 110.

On the other hand, the second selected base station determination unit 113 of the mobile station 110 compares the base stations 130 selected by the base station selection unit 111 at this time with the base stations 130 selected by the base station selection unit 111 at the previous time, and determines whether there is a base station 130 not selected at the previous time and selected at this time (S104). When it is determined that the base station 130 is not selected at the previous time and is selected at this time (S104: Yes), the second selected base station determination unit 113 transmits data indicating the base station 130 to the permission command data transmission unit 115.

When the data transmitted from the second selected base station determination unit 113 is received, the permission command data transmission unit 115 of the mobile station 110 transmits data for commanding the permission of a downlink to the base station 130 indicated by the data (S105). In this way, until data for commanding the inhibition of a downlink is received, for example, when data transmitted from a server and the like on a network and addressed to the mobile station 110 is received, the base station 130 having received the data transmits the data to the mobile station 110.

For example, when the train T exists at a position P1 of the track P, it is assumed that the mobile station 110 selects the two base stations 130*a* and 130*b* as base stations 130 with which the mobile station 110 should simultaneously communicate, and receives a downlink from the two base stations 130*a* and 130*b*. It is assumed that a downlink from the base station 130*c* is inhibited. Then, in the case in which the train T has moved from the position P1 to a position P2 of the track P, when the radio wave intensity of each base station 130 at the position P2 is in a descending command of the base station 130*b*, the base station 130*c*, and the base station 130*a*, the mobile station 110 selects the two base stations 130*b* and 130*c* from the descending command of the radio field intensity as base stations 130 with which the mobile station 110 should simultaneously communicate among the three base stations 130. The mobile station 110 transmits data for commanding the inhibition of a downlink to the base station 130*a* selected at the position P1 and not selected at the position P2 as the base station 130 with which the mobile station 110 should simultaneously communicate. In this way, the base station 130*a* does not transmit a downlink. The mobile station 110 transmits data for commanding the permission of a downlink to the base station 130*c* not selected at the position P1 and selected at the position P2 as the base station 130 with which the mobile station 110 should simultaneously communicate. In this way, the base station 130*c* transmits a downlink.

As described above, the mobile communication system 100 includes the mobile station 110 provided in the train T moving along the track P. The mobile communication system 100 includes the plurality of base stations 130 provided along the track P to each perform wireless communication with the mobile station 110 through the same channel of the same frequency band. The mobile station 110 repeatedly selects two base stations 130, with which the mobile station 110 should simultaneously communicate, from among the plurality of base stations 130 with the passage of time. The mobile station 110 compares base stations 130 selected at this time with base stations 130 selected at the previous time, and determines whether there is a base station 130 selected at the previous time and not selected at this time. The mobile station 110 compares the base stations 130 selected at this time with the base stations 130 selected at the previous time, and determines whether there is a base station 130 not selected at the previous time and selected at this time. When it is determined that the base station 130 is selected at the previous time and is not selected at this time, the mobile station 110 transmits data for commanding the inhibition of a downlink to the base station 130. When it is determined that the base station 130 is not selected at the previous time and is selected at this time, the mobile station 110 transmits data for commanding the permission of a downlink to the base station 130.

As described above, in the mobile communication system 100, since the plurality of base stations 130 perform wireless communication with the mobile station 110 through the same channel of the same frequency band, respectively, for example, the mobile station 110 receives the same data transmitted from two base stations 130, even if a problem occurs in communication with one base station 130 due to shadowing and the like, the data from the other base station 130 is received, so that it is possible to avoid a communication problem due to the shadowing and the like without depending on handover. However, as described above, in the system in which the mobile station 110 performs wireless communication with the plurality of base stations 130 through the same channel of the same frequency band, if radio waves from the base stations 130 are reached, even when the state of the radio waves is not good, since downlinks from the base stations 130 are received, it is less preferable. In the mobile communication system 100, two base stations 130, with which the mobile station 110 should simultaneously communicate, are selected, and base stations 130 other than the selected base stations 130 are prevented from transmitting downlinks, so that it is possible to effectively utilize only two necessary base stations 130 among the plurality of base stations 130 with which the mobile station 110 can communicate.

As described above, when there is the mobile station 110 in an area in which a communication range of one base station 130 and a communication range of the other base station 130 overlap each other, the two geographically adjacent base stations 130 of the plurality of base stations 130 are disposed such that a difference between a distance from the one base station 130 to the mobile station 110 and a distance from the other base station 130 to the mobile station 110 is smaller than a distance to which a radio wave can propagate for a time corresponding to the length of a guard interval of data simultaneously transmitted from the two base stations 130.

In this way, according to the mobile communication system 100, when OFDM is employed in communication between the mobile station 110 and the base stations 130, the mobile station 110 can reliably process data simultaneously transmitted from the two base stations 130. According to the mobile communication system 100, even if a link has been temporally established with a remote base station 130 out of a range capable of preventing intersymbol interference by a guard interval, a downlink is not permitted for such a remote base station 130, so that it is possible to prevent intersymbol interference with downlink signals from neighboring base stations.

As described above, when there is the mobile station 110 in an area in which a communication range of one base station 130 and a communication range of the other base station 130 overlap each other, the two geographically adjacent base stations 130 of the plurality of base stations 130 are disposed such that a difference between a distance from the one base station 130 to the mobile station 110 and a distance from the other base station 130 to the mobile station 110 is smaller than a distance to which a radio wave can propagate for a time required for switching a state of using a spread code designated in the one base station 130 to a state of using a spread code designated in the other base station 130.

In this way, according to the mobile communication system 100, when CDMA is employed in communication between the mobile station 110 and the base stations 130, the mobile station 110 can reliably process data simultaneously transmitted from the two base stations 130.

Figure 4:
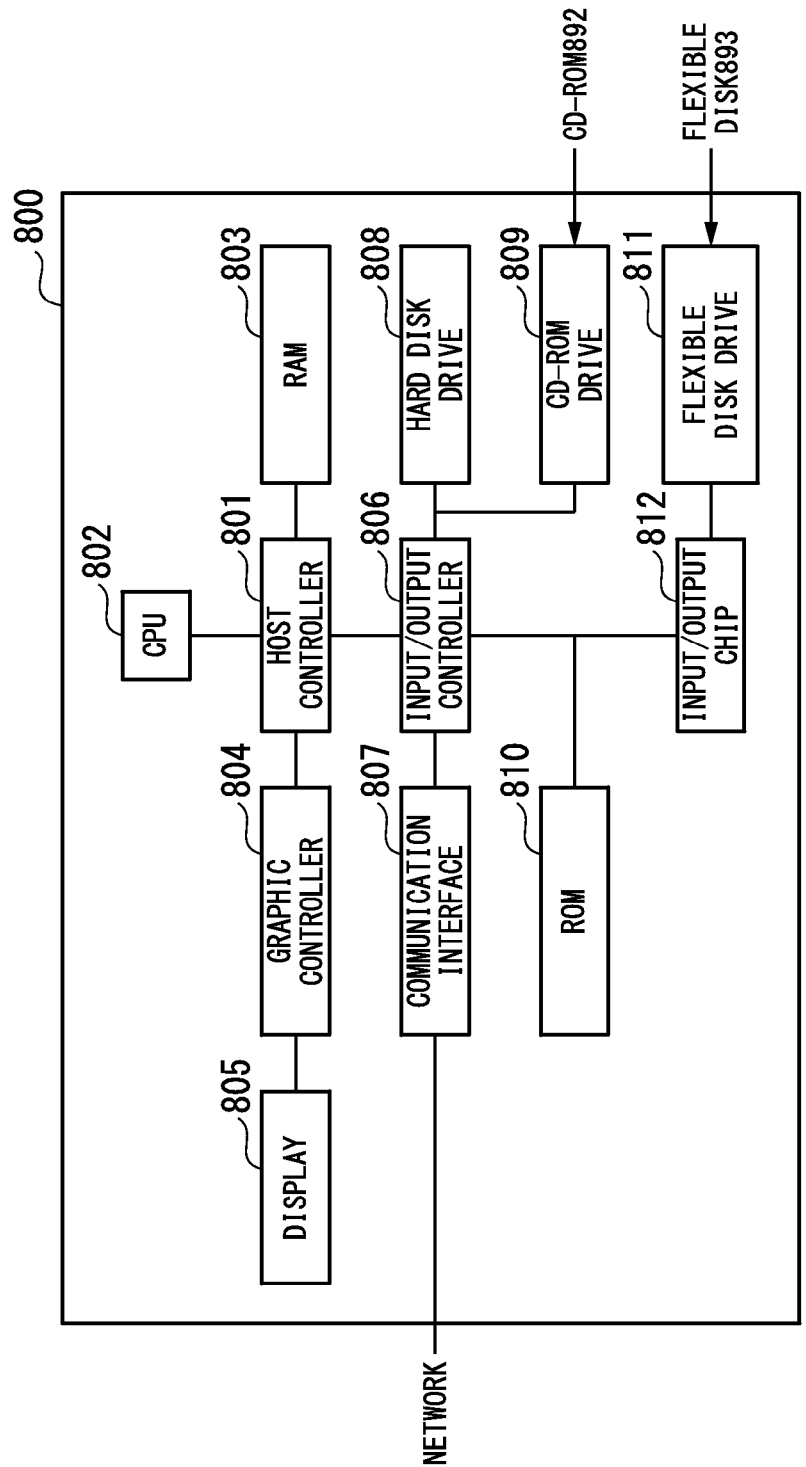
FIG. 4 is a diagram showing one example of a hardware configuration of a computer 800 constituting a mobile station 110 according to the present embodiment.

FIG. 4 illustrates one example of a hardware configuration of a computer 800 constituting the mobile station 110 according to the present embodiment. The computer 800 according to the present embodiment includes a CPU peripheral unit having a CPU (central processing unit) 802, a RAM (random access memory) 803, a graphic controller 804, and a display 805 connected with one another by a host controller 801, an input/output unit having a communication interface 807, a hard disk drive 808, and a CD-ROM (compact disk read only memory) drive 809 connected with one another by an input/output controller 806, and a legacy input/output unit having a ROM (read only memory) 810, a flexible disk drive 811, and an input/output chip 812 connected to the input/output controller 806.

The host controller 801 connects the RAM 803, the CPU 802 accessing the RAM 803 at a high transmission rate, and the graphic controller 804 to one another. The CPU 802 operates on the basis of programs stored in the ROM 810 and the RAM 803, and controls each element. The graphic controller 804 acquires image data generated by the CPU 802 and the like on a frame buffer provided in the RAM 803, and displays the image data on the display 805. Alternatively, the graphic controller 804 may include the frame buffer, which stores the image data generated by the CPU 802 and the like, therein.

The input/output controller 806 connects the host controller 801, the communication interface 807 serving as a relatively high speed input/output device, the hard disk drive 808, and the CD-ROM drive 809 to one another. The hard disk drive 808 stores programs and data used by the CPU 802 in the computer 800. The CD-ROM drive 809 reads programs and data from a CD-ROM 892 and provides the programs and the data to the hard disk drive 808 via the RAM 803.

The ROM 810, and the flexible disk drive 811 and the input/output chip 812 serving as relatively low speed input/output devices are connected to the input/output controller 806. The ROM 810 stores a boot program to be executed when the computer 800 starts to operate, and/or programs and the like depending on the hardware of the computer 800. The flexible disk drive 811 reads programs or data from a flexible disk 893 and provides the programs or the data to the hard disk drive 808 via the RAM 803. The input/output chip 812 connects the flexible disk drive 811 to the input/output controller 806, and for example, connects various types of input/output devices to the input/output controller 806 via parallel ports, serial ports, a keyboard port, a mouse port and the like.

The programs provided in the hard disk drive 808 via the RAM 803 are stored in a recording medium such as the flexible disk 893, the CD-ROM 892, or an IC (integrated circuit) card, and are provided by a user. The programs are read from the recording medium, are installed in the hard disk drive 808 in the computer 800 via the RAM 803, and are executed in the CPU 802.

The program, which is installed in the computer 800 and causes the computer 800 to serve as the mobile station 110, causes the computer 800 to serve as the base station selection unit 111 that repeatedly selects two base stations 130, with which the mobile station 110 should simultaneously communicate, from among the plurality of base stations 130 with the passage of time in step S101, the first selected base station determination unit 112 that compares base stations 130 selected by the base station selection unit 111 at this time with base stations 130 selected by the base station selection unit 111 at the previous time and determines whether there is a base station 130 selected at the previous time and not selected at this time in step S102, the second selected base station determination unit 113 that compares the base stations 130 selected by the base station selection unit 111 at this time with the base stations 130 selected by the base station selection unit 111 at the previous time and determines whether there is a base station 130 not selected at the previous time and selected at this time in step S104, the inhibition command data transmission unit 114 that transmits data for commanding the inhibition of a downlink to the base station in step S103 when the first selected base station determination unit 112 determines that the base station 130 is selected at the previous time and is not selected at this time, and the permission command data transmission unit 115 that transmits data for commanding the permission of a downlink to the base station in step S105 when the second selected base station determination unit 113 determines that the base station 130 is not selected at the previous time and is selected at this time.

The information processing described in these programs is read in the computer 800, and thus serves as the base station selection unit 111, the first selected base station determination unit 112, the second selected base station determination unit 113, the inhibition command data transmission unit 114, and the permission command data transmission unit 115 that are detailed means in which software and the aforementioned various hardware resources have cooperated with each other. By these detailed means, the operation or processing of information corresponding to the purpose of the computer 800 in the present embodiment is realized, so that the specific mobile station 110 corresponding to the purpose is constructed.

As one example, in the case of performing communication between the computer 800 and an external device and the like, the CPU 802 executes a communication program loaded on the RAM 803, and instructs a communication process to the communication interface 807 on the basis of processing content described in the communication program. Under the control of the CPU 802, the communication interface 807 reads transmission data stored in a transmission buffer area and the like provided on a storage device, such as the RAM 803, the hard disk drive 808, the flexible disk 893, or the CD-ROM 892, and transmits the transmission data to a network, or writes reception data received from the network in a reception buffer area and the like provided on the storage device. As described above, the communication interface 807 may also transmit the transmission/reception data to the storage device by a direct memory access method, or alternatively, the CPU 802 may read data from the storage device serving as a transmission source or the communication interface 807, and write the data in the communication interface 807 serving as a transmission destination or the storage device, so that the transmission/reception data may be transmitted.

The CPU 802 allows the whole or a necessary part of files, a data base and the like, which are stored in an external storage device such as the hard disk drive 808, the CD-ROM 892, or the flexible disk 893, to be read in the RAM 803 by direct memory access transmission and the like, and performs various types of processing of data in the RAM 803. The CPU 802 writes processed data back to the external storage device by the direct memory access transmission and the like.

In such processing, since the RAM 803 is regarded to temporarily hold the content of the external storage device, the RAM 803, the external storage device and the like are generically called memory, a storage unit, a storage device and the like in the present embodiment. In the present embodiment, various pieces of information in various types of programs, data, tables, databases and the like is stored on such a storage device and is subjected to information processing. The CPU 802 can hold a part of the RAM 803 in a cache memory and perform reading and writing on the cache memory. Even in such a form, since the cache memory takes charge of a part of the functions of the RAM 803, the cache memory is assumed to be included in the RAM 803, a memory, and/or a storage device, except that the cache memory is shown as distinct in the present embodiment.

The CPU 802 performs various types of processing, which is designated by a command string of a program and includes various types of operations, information processing, condition determination, information retrieval, replacement and the like described in the present embodiment, with respect to the data read from the RAM 803, and writes the processed data back to the RAM 803. For example, in the case of performing the condition determination, the CPU 802 determines whether various variables in the present embodiment satisfy conditions such as large, small, equal to or more than, equal to or less than, or equal as compared with other variables or constants, and diverts the command string to a different command string or calls a sub-routine when the conditions are satisfied or not.

The CPU 802 can retrieve information stored in the files, the database and the like in the storage device. For example, when a plurality of entries, in which attribute values of a second attribute have been associated with attribute values of a first attribute, are stored in the storage device, the CPU 802 can retrieve an entry coinciding with a condition in which the attribute values of the first attribute have been designated from among the plurality of entries stored in the storage device, and reads attribute values of a second attribute stored in the entry, so that it is possible to obtain attribute values of a second attribute, which satisfy predetermined conditions and have been associated with the first attribute.

The aforementioned program or module may also be stored in an external storage medium. As the storage medium, in addition to the flexible disk 893 and the CD-ROM 892, an optical recording medium such as DVD (digital versatile disk) or CD (compact disk), a magneto-optical recording medium such as MO (magneto-optical disk), a tape medium, a semiconductor memory such as an IC card, and the like are available. A hard disk provided in a server system connected to a dedicated communication network or the Internet, or a storage medium such as RAM may be used as a storage medium, so that programs may be provided in the computer 800 via the network.

While the present invention has been described using the embodiment, the technical range of the present invention is not limited to the range described in the embodiment. It is apparent to those skilled in the art that various changes or improvements can be made in the embodiment. It is apparent from the appended claims that the embodiment thus changed or improved can also be included in the technical range of the present invention.

It should be noted that an execution order of each process of an operation, a procedure, a step, a stage and the like in a system, a method, an apparatus, a program, and a recording medium described in the claims, the specification, and the drawings is not specifically identified through the use of special "before", "prior to" and the like, and can be realized in any order as long as the output of a previous process is not used by a subsequent process. One must note that, even if an operation flow in the claims, the specification, and the drawings is described with the use of "first", "next" and the like for convenience, it does not mean that the operation flow is necessarily to be implemented in that order.

INDUSTRIAL APPLICABILITY

As apparent from the above description, according to the aforementioned aspects, it is possible to effectively utilize only two necessary base stations of a plurality of base stations with which a mobile station can communicate.

REFERENCE SIGNS LIST

100 Mobile communication system
110 Mobile station
111 Base station selection unit
112 First selected base station determination unit
113 Second selected base station determination unit
114 Inhibition command data transmission unit
115 Permission command data transmission unit
130 Base station
800 Computer
801 Host controller
802 CPU
803 RAM
804 Graphic controller
805 Display
806 Input/output controller
807 Communication interface
808 Hard disk drive
809 CD-ROM drive
810 ROM
811 Flexible disk drive
812 Input/output chip
892 CD-ROM
893 Flexible disk
P Track
T Train

The invention claimed is:

1. A mobile communication system in which a mobile station performs communication while moving, the mobile communication system comprising:
   a mobile station that is provided in a moving object moving along a predetermined route; and
   a plurality of base stations provided along the route, wherein each of the plurality of base stations performs wireless communication with the mobile station through a same channel of a same frequency band,
   wherein the mobile station comprises:
   a base station selection unit that repeatedly selects two base stations, with which the mobile station simultaneously communicates, among the plurality of base stations, sequentially;
   a first selected base station determination unit that compares base stations selected by the base station selection unit at this time with base stations selected by the base station selection unit at a previous time and determines whether there is a first base station selected at the previous time and not selected at this time;
   a second selected base station determination unit that compares the base stations selected by the base station selection unit at this time with the base stations selected by the base station selection unit at the previous time and determines whether there is a second base station not selected at the previous time and selected at this time;
   an inhibition command data transmission unit that transmits data for commanding inhibition of a downlink to the first base station when the first selected base station determination unit determines that the first base station is selected at the previous time and is not selected at this time; and
   a permission command data transmission unit that transmits data for commanding permission of a downlink to the second base station when the second selected base station determination unit determines that the second base station is not selected at the previous time and is selected at this time.

2. The mobile communication system according to claim 1, wherein, when there is the mobile station in an area in which a communication range of one base station of geographically adjacent two base stations among the plurality of base stations and a communication range of the other base station of the geographically adjacent two base stations among the plurality of base stations overlap each other, the geographically adjacent two base stations are disposed such that a difference between a distance from the one base station to the mobile station and a distance from the other base station to the mobile station is smaller than a distance to which a radio wave propagates for a time corresponding to a length of a guard interval of data simultaneously transmitted from the geographically adjacent two base stations.

3. The mobile communication system according to claim 1, wherein, when there is the mobile station in an area in which a communication range of one base station of geographically adjacent two base stations among the plurality of base stations and a communication range of the other base station of the geographically adjacent two base stations among the plurality of base stations overlap each other, the geographically adjacent two base stations are disposed such that a difference between a distance from the one base station to the mobile station and a distance from the other base station to the mobile station is smaller than a distance to which a radio wave propagates for a time required for switching a state of using a spread code designated in the one base station to a state of using a spread code designated in the other base station.

4. A mobile communication method in which a mobile station performs communication while moving, the mobile communication method comprising:
   a base station selection step in which a mobile station provided in a moving object moving along a predetermined route repeatedly selects two base stations, with which the mobile station simultaneously communicates, among a plurality of base stations, which are provided along the route and each perform wireless communication with the mobile station through a same channel of a same frequency band, sequentially;

a first selected base station determination step in which the mobile station compares base stations selected at this time in the base station selection step with base stations selected at a previous time in the base station selection step and determines whether there is a first base station selected at the previous time and not selected at this time;

a second selected base station determination step in which the mobile station compares the base stations selected at this time in the base station selection step with the base stations selected at the previous time in the base station selection step and determines whether there' is a second base station not selected at the previous time and selected at this time;

an inhibition command data transmission step in which, when it is determined in the first selected base station determination step that the first base station is selected at the previous time and is not selected at this time, the mobile station transmits data for commanding inhibition of a downlink to the first base station; and a permission command data transmission step in which, when it is determined in the second selected base station determination step that the second base station is not selected at the previous time and is selected at this time, the mobile station transmits data for commanding permission of a downlink to the second base station.

5. A mobile station provided in a moving object moving along a predetermined route, the mobile station comprising:

a base station selection unit that repeatedly selects two base stations, with which the mobile station simultaneously communicates, among a plurality of base stations, which are provided along the route and each perform wireless communication with the mobile station through a same channel of a same frequency band, sequentially;

a first selected base station determination unit that compares base stations selected by the base station selection unit at this time with base stations selected by the base station selection unit at a previous time and determines whether there is a first base station selected at the previous time and not selected at this time;

a second selected base station determination unit that compares the base stations selected by the base station selection unit at this time with the base stations selected by the base station selection unit at the previous time and determines whether there is a second base station not selected at the previous time and selected at this time;

an inhibition command data transmission unit that transmits data for commanding inhibition of a downlink to the first base station when the first selected base station determination unit determines that the first base station is selected at the previous time and is not selected at this time; and a permission command data transmission unit that transmits data for commanding permission of a downlink to the second base station when the second selected base station determination unit determines that the second base station is not selected at the previous time and is selected at this time.

6. A non-transitory recording medium, which records a program that causes a computer to serve as a mobile station provided in a moving object moving along a predetermined route, records the program that causes the computer to serve as a base station selection unit that repeatedly selects two base stations, with which the mobile station simultaneously communicates, among a plurality of base stations, which are provided along the route and each perform wireless communication with the mobile station through a same channel of a same frequency band, sequentially, a first selected base station determination unit that compares base stations selected by the base station selection unit at this time with base stations selected by the base station selection unit at a previous time and determines whether there is a first base station selected at the previous time and not selected at this time, a second selected base station determination unit that compares the base stations selected by the base station selection unit at this time with the base stations selected by the base station selection unit at the previous time and determines whether there is a second base station not selected at the previous time and selected at this time, an inhibition command data transmission unit that transmits data for commanding inhibition of a downlink to the first base station when the first selected base station determination unit determines that the first base station is selected at the previous time and is not selected at this time, and a permission command data transmission unit that transmits data for commanding permission of a downlink to the second base station when the second selected base station determination unit determines that the second base station is not selected at the previous time and is selected at this time.

* * * * *